US008602053B2

(12) United States Patent
Jjilderos

(10) Patent No.: US 8,602,053 B2
(45) Date of Patent: Dec. 10, 2013

(54) VALVE ASSEMBLY FOR A DIFFERENTIAL PRESSURE SENSOR WITH AUTOMATIC ZERO POINT CALIBRATION AND FLUSHING

(75) Inventor: Daniel Jjilderos, Bramhult (SE)

(73) Assignee: TA Hydronics AG, Ljung (SE)

( * ) Notice: Subject to any disclaimer, the term of this patent is extended or adjusted under 35 U.S.C. 154(b) by 0 days.

(21) Appl. No.: 13/805,701

(22) PCT Filed: May 27, 2011

(86) PCT No.: PCT/SE2011/050661
§ 371 (c)(1),
(2), (4) Date: Dec. 20, 2012

(87) PCT Pub. No.: WO2012/002874
PCT Pub. Date: Jan. 5, 2012

(65) Prior Publication Data
US 2013/0098475 A1  Apr. 25, 2013

(30) Foreign Application Priority Data

Jun. 28, 2010  (SE) ..................................... 1000682

(51) Int. Cl.
| F16K 1/44 | (2006.01) |
| F16K 17/26 | (2006.01) |
| F16K 24/00 | (2006.01) |
| F16K 17/00 | (2006.01) |
| F16K 21/04 | (2006.01) |
| F16K 11/20 | (2006.01) |
| F16K 11/074 | (2006.01) |
| G01L 27/00 | (2006.01) |

(52) U.S. Cl.
USPC ..................... 137/493.8; 137/493.9; 137/538; 137/597; 137/625.35; 137/625.43; 73/1.62; 73/1.72

(58) Field of Classification Search
CPC .......... F16K 17/044; F16K 17/02; F16K 1/32
USPC ........ 137/597, 493.8, 493.7, 493.9, 538, 493, 137/625.5, 625.43, 625.35, 625.38; 73/37, 73/1.01, 1.57, 1.62, 1.72
See application file for complete search history.

(56) References Cited

U.S. PATENT DOCUMENTS

| 3,437,964 A | 4/1969 | Tausch |
| 3,651,827 A | 3/1972 | Hammer et al. |

(Continued)

FOREIGN PATENT DOCUMENTS

| DE | 195 03 488 A1 | 8/1996 |
| DE | 197 18 454 A1 | 11/1998 |
| EP | 0 126 697 | 11/1984 |
| GB | 2 091 883 | 8/1982 |
| GB | 2 410 332 A | 7/2005 |

(Continued)

Primary Examiner — William McCalister
Assistant Examiner — Michael R Reid
(74) Attorney, Agent, or Firm — Davis & Bujold, PLLC; Michael J. Bujold

(57) ABSTRACT

A valve assembly (1) included in a system for measuring differential pressures in a fluid system and where the valve assembly (1) includes a valve body (7) with an inlet (13) and an outlet (14) for connection to the fluid system, ducts (32, 33) for communication with a differential pressure sensor (12) for registration the differential pressure, a cavity (22) including a calibration cone (10) which is movable in the cavity (22) between a measuring position and a position for zero point calibration/flushing via the valve assembly (1). In instances when the measuring position of the device does not exists, the calibration cone (10) separates the differential pressure sensor (12) from the fluid system, i.e., in its initial position, and, at the same time, the valve assembly (1), in this position, is automatic flushed so as to get rid of any enclosed air in the valve assembly (1).

12 Claims, 4 Drawing Sheets

(56) References Cited

U.S. PATENT DOCUMENTS

| | | | | |
|---|---|---|---|---|
| 4,969,486 A | * | 11/1990 | Puzio | 137/624.18 |
| 5,282,492 A | | 2/1994 | Angeli | |
| 5,868,155 A | | 2/1999 | Hutton | |
| 6,035,724 A | * | 3/2000 | Hewson | 73/756 |

FOREIGN PATENT DOCUMENTS

| | | |
|---|---|---|
| JP | 63-011827 A | 1/1988 |
| JP | 1-285832 | 11/1989 |
| JP | 11-201309 | 7/1999 |
| WO | 2005/019713 A1 | 3/2005 |

\* cited by examiner

VALVE ASSEMBLY FOR A DIFFERENTIAL PRESSURE SENSOR WITH AUTOMATIC ZERO POINT CALIBRATION AND FLUSHING

This application is a national stage completion of PCT/SE2011/050661 filed May 27, 2011 which claims priority from Swedish Application Serial No. 1000682-3 filed Jun. 28, 2010

TECHNICAL FIELD

The present invention relates to a valve assembly for a differential pressure sensor for measuring of pressures in a fluid system, for instance in a heating or cooling system and where the assembly is mounted via measuring hoses on a measuring nipple to, for example, a valve, or a measuring nipple directly on a container or piping, and where the assemble provides good measuring accuracy through automatic zero point calibration and automatic flushing of the valve assembly.

BACKGROUND OF THE INVENTION

To measure pressure in fluid systems, differential pressure sensors are often used in combination with some sort of valve assembly, which has a primary purpose of protecting the differential pressure sensor against extreme continuous pressures or pressure shocks that are higher than the sensor can handle. Such assemblies often also have functions for flushing the assembly to get rid of enclosed air in cavities and have functions to calibrate the differential pressure sensor, a so called zero point calibration. The purpose of the calibration procedure is to ensure that before measuring begins, both measuring sides of the pressure sensor have the same pressure.

There are several examples of devices that have a manual flushing function, for instance U.S. Pat. No. 5,868,155 A1 and WO 2005019713.

There are also devices that solve the problem with the zero point calibration and flushing of the valve assembly by a manual procedure. One example of such a solution is shown in GB 2 410 332 A, in which a manual controllable valve (30, 40) fluidly connects both pressure sides, and accordingly, the system is flushed and zero point calibrated.

The problem with earlier solutions, for instance the solution described by GB 2 410 332 A, is that by the zero point calibration of the differential pressure sensor, the high and low pressure side is connected by fluid, which results in that the zero point will be dependent on the rate of flow of the fluid through the valve assemble and the thereby caused pressure drop, which leads to that an error will be caused by the calibration. There is a solution of this problem according to the device in JP 63011827 A where the high and low pressure side, by calibration, isn't in contact with the fluid, but this device don't solve the problem of at the same time and automatically be rid of enclosed air in the valve.

SUMMARY OF THE INVENTION

The object of the present invention is to solve the problem of fluidly connecting the high and low pressure side in the zero point calibration and at the same time solving the problem removing air enclosed in the valve. This is achieved through both measuring sides of the differential pressure sensor being fluidly separate from the flowing fluid during the zero point calibration, since a calibration cone separates the measuring sides from the fluid by means of seals. This position of the calibration cone constitutes the initial position of the assembly. Accordingly, the advantage of eliminating calibration error is achieved. Moreover a flushing function is obtained, ridding any enclosed air from the complete valve assembly, in those cases when the assembly is not in the measuring position, that is, in its initial position. The calibration cone has a design that permits an open flowing passage between high and low pressure sides in this initial position. Accordingly, the valve assembly is always flushed in this initial position, which is an advantage compared to older solutions that do not have this automatic flushing function.

According to a preferred embodiment of the invention the differential pressure sensor is only in contact with the fluid circuit when measuring is done. The calibration cone permits this communication only in a measuring position, by the measuring procedure itself. Accordingly, the advantage is obtained that during the times in which there is no measuring, there is no pressure/no load against the connected differential pressure sensor. This is an advantage, especially at longer times of connection.

According to a preferred embodiment of the invention, the device comprises at least one return spring, provided in connection with the calibration cone. The return spring causes the calibration cone to return to the initial position from the measuring position after measuring is performed. Thereby the device is always in the initial position during connection/disconnection from the fluid system. According to the above object, this initial position constitutes the position for zero point calibration and also the position for flushing the complete valve assembly. Accordingly, those procedures which are important to the quality of the measuring are always performed before a measuring begins. This then eliminates the risk of forgetting to preform those procedures, which is a problem by known solutions.

In a further preferred embodiment of the invention assured zero point calibration and flushing is obtained. In this embodiment that those procedures occur automaticly via an actuator or an actuator combined with the return spring that moves the calibration cone between its initial position and its measuring position. After finishing a measuring sequence, the device is always returned to the position for flushing and zero point calibration either through the actuator returning the device to this position or, alternatively, through other stored energy, preferably the return spring, causing this return. Accordingly, when the device is connected to or is disconnected from a measuring point, the devise always returns to its initial position, that being its position for flushing and zero point calibration. This results in those procedures being assured before a next measuring.

In a further preferred embodiment of the invention, the actuator is remote controlled by means of a manual unit or a computer system. The possibility of communication with a computer system permits communication to the system for building management, so called BMS-systems (Building Management System). The remote control in turn permits a user to remotely calibrate and flush several valve assemblies, and thereafter measure the fluid pressure of several valves with assured results, and to collect those data, and to control flows in the fluid system and, consequently, to adjust the valves included in the fluid system. Another disadvantage of current solutions is that because of the manual management, the service staff/adjuster has to move to every valve in a fluid system of a building, which costs time as well as power. Consequently, one immediate advantage of the invention is that motor control of the actuator together with remote control permits the service staff/adjuster to act from one or a few places in connection with the fluid system.

To sum up some advantages obtained with the present invention compared to existing devices, in relation to a required measuring are:

- both sides of the differential pressure sensor is placed outside the flow of fluid by the zero point calibration which leads to that the zero point is independent from the flow rate of the fluid and the thereby occurring pressure drop
- the valve assembly only opens fluid communication to the differential pressure sensor at the moment of measuring, which implies that during connection/disconnection and during times not outside the moment of measuring no pres-sure/load is exerted on the differential pressure sensor;
- an assured zero point calibration which results in more assured measuring results;
- an assured flushing to fill up the cavities of the valve assembly and to eliminate the air in the valve assembly, which leads to more assured measuring results;
- the motor control permits both automation and remote control of the zero point calibration, flushing, and measuring procedures;
- an improved working environment for the service staff/ adjuster;
- a savings in time and costs in connection with the putting the device into service and service/maintenance of the device;
- the device permits communication with the building management system, a so called BMS-system (Building Management System).

The above mentioned preferred embodiments of the invention are stated in the dependent claims. The constructive design of the present invention is described in detail by the following description of an example embodiment of the invention with reference to the accompanying drawings showing a preferred, but not limiting, embodiment of the invention. Moreover the invention provides advances over the prior art in different respects. This is realized in the present invention by an arrangement characterized by the base claim.

BRIEF DESCRIPTION OF THE DRAWINGS

The invention is represented in detail in diametrical, partly schematic cross-sections or perspective views.

DETAILED DESCRIPTION OF THE DRAWINGS

Figure 1:
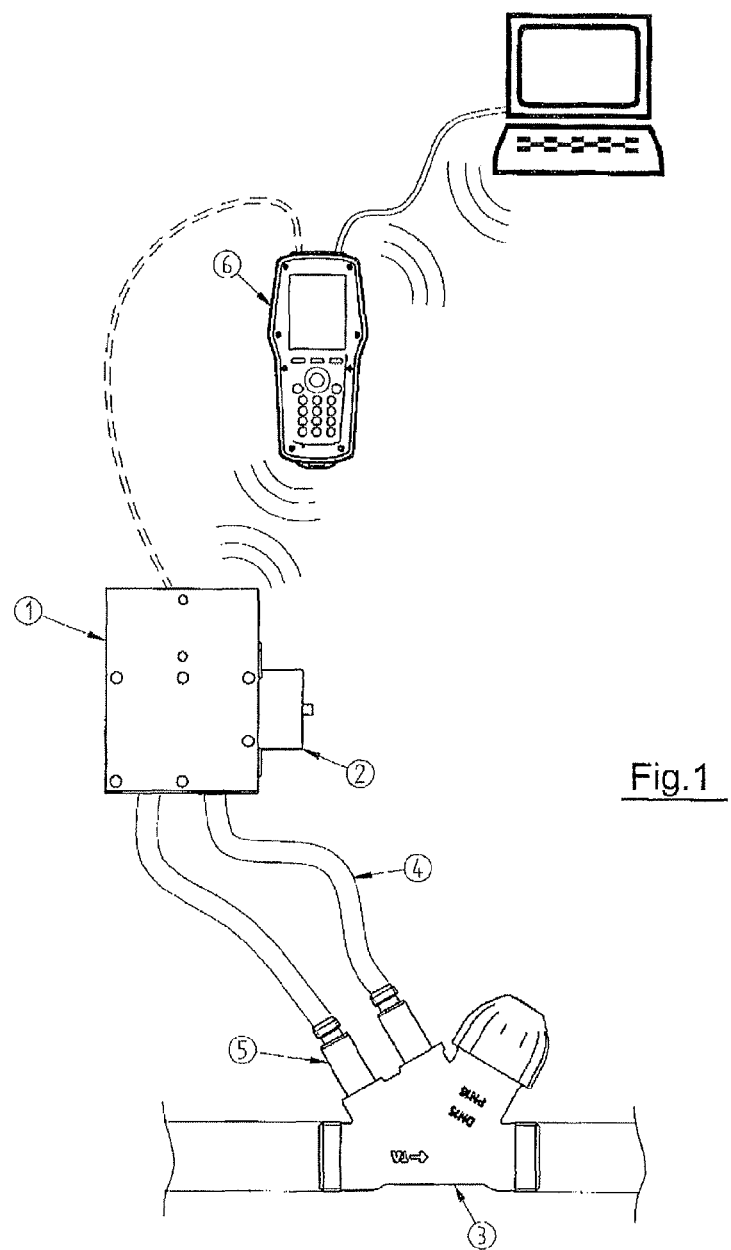
FIG. 1 shows the portion of a fluid system where a differential pressure measuring system is connected.

FIG. 1 shows an example of a complete valve assembly 1 provided with an actuator 2 where the valve assembly 1 is connected to a valve 3 via measuring hoses 4, which are connected to the measuring nipples 5 of the valve. This figure also includes a manual unit 6 for preferable wireless communication with the actuator 2 and, where appropriate, communication with a computer or a computer system.

Figure 2:
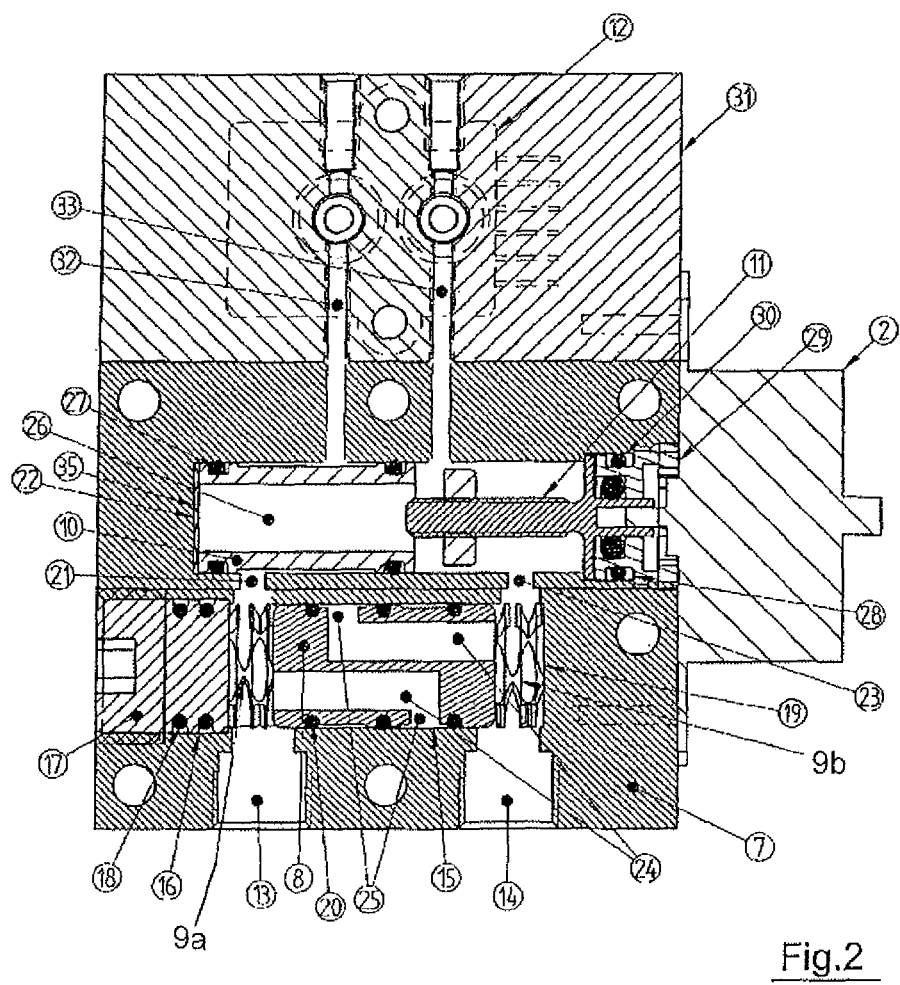
FIG. 2 shows details of the complete valve assembly.

FIG. 2 shows details of the complete valve assembly.

The complete valve assembly is provided with a valve body 7, a safety valve cone (spool) 8, return springs 9a, 9b on both sides of the safety valve cone 8, a calibration cone (spool) 10, with an axis 11, connected to the actuator 2. A sensor carrier 31, with a differential pressure sensor 12, is mounted on the valve body 7. The measuring hoses 4 are connected to the valve body 7 via two connections, an inlet 13 and outlet 14. The inlet 13 is intended to be the high pressure side and the outlet 14 is intended to be the low pressure side. Of course those sides can be reversed, depending on how the connections are made in relation to the high and low side of the fluid system. In addition, the valve body has a cavity 15 that is sized to receive the outer dimensions of the safety valve cone 8. In the outer end 16 of the cavity 15, a safety valve stop 17 is provided with sealing elements 18. In connection with the safety valve stop 17 there is the first return spring 9a. The safety valve stop 17 constitutes the base for the return spring 9a. A second return spring 9b is placed at the bottom 19 of the cavity. The safety valve cone 8 is situated between the first return spring 9a and a second return spring 9b and, as a result, is clamped between the two return springs 9a, 9b. The safety valve cone 8 preferable includes two interior recessed cavities 24 in a common axial direction relative the safety valve cone 8. The cavities emerge at each end of the safety valve cone 8. Each cavity also has a recess 25 that extends outward to the periphery of the cone. The safety valve cone 8 is externally provided with sealing elements 20 on the surface of the periphery, on either side of the recesses 25. At the first return spring 9a, a duct 21 extends from the inlet 13, thought the cavity 15, and into a cavity 22 that by sized to receive the outer dimensions of the calibration cone 10. Similarly, a second duct 23 extends from the outlet 14 to the cavity 22, via the bottom 19 of the cavity 15. The calibration cone 10 is situated in the cavity 22. The calibration cone 10 preferably includes an interior recessed cavity 26 that is axially aligned relative the calibration cone 10 and extends through the entire length of the calibration cone 10. The exterior of the calibration cone 10 is preferably provided with two sealing elements 27 along the peripheral surface at each respective end. At the other end 28 of the cavity 22, a stop lug 29 is provided with sealing elements 30. This stop lug 29 constitutes the attachment/ holder of the actuator 2. Its axis 11 projects through the stop lug 29. The axis 11 is fastened at the calibration cone 10. A return spring 35 is clamped between the bottom of the cavity 22 and the calibration cone 10. Ducts 32 and 33 extend from the peripheral surface of the cavity 22 to the differential pressure sensor 12 in the sensor support 31.

Figure 3:
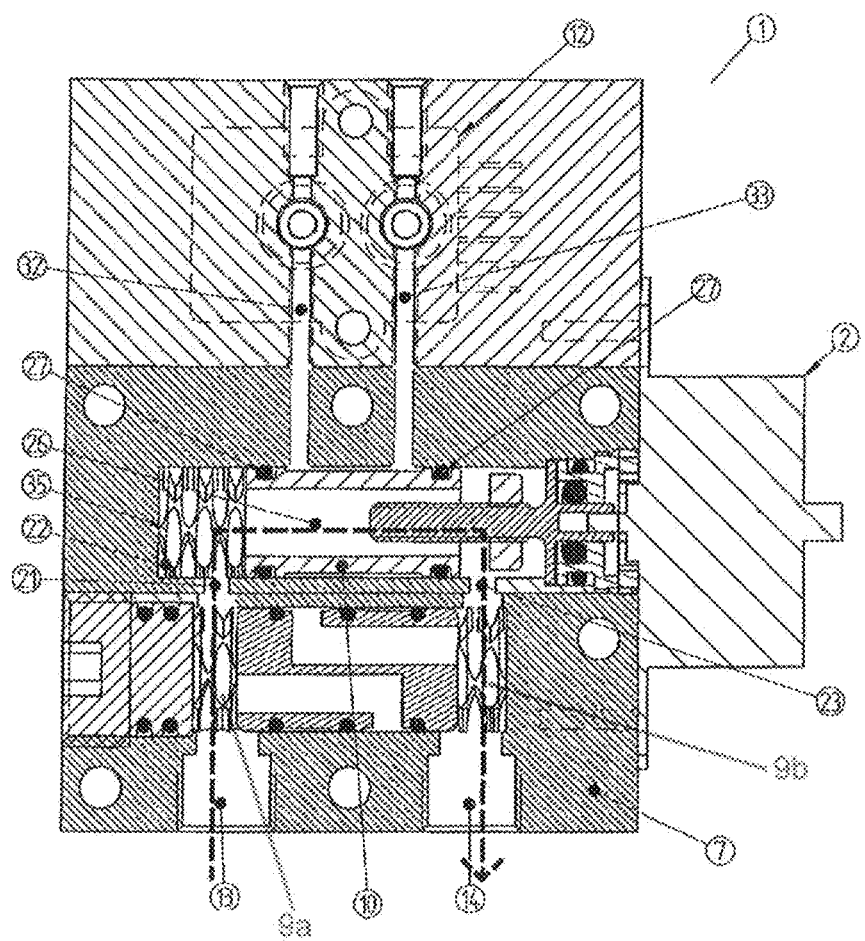
FIG. 3 shows the complete valve assembly in the initial position, that is, in the flushing/zero point calibration position.

FIG. 3 shows the complete valve assembly in its initial position, that is, its position for flushing/zero point calibration. Except for when measuring, the valve assembly is always in its initial position, its position for flushing/zero point calibration. After completing a measuring sequence, either the actuator 2 or another stored energy element, like a return spring 35, causes the device to return back to the flushing/zero point calibration position. In this initial position, the calibration cone 10 is located between the ducts 21 and 23 and thereby both the sealing elements 27 are positioned on either side of the ducts 32 and 33. This causes ducts 32 and 33 to be short circuited, and consequently receive the same static pressure. Accordingly, the differential pressure sensor 12 will be zero point calibrated, and the calibration will occur outside the fluid flow because the ducts 32 and 33 communicate with a location of the cavity's 22 peripheral surface which is sealed from the remainder of the cavity 22 by the sealing elements 27 on the calibration cone 10. The flushing occurs at the same time because the design of the calibration cone and its position permit an open flowing passage between high and low pressure side, that is, from the first connection/inlet 13, via the duct 21, to the cavity 22, through the cavity 26 of the calibration cone 10 and back into the cavity 22, then to the duct 23, and thereafter to the second connection/outlet 14. After this process, the complete valve assembly 1 is flushed and free from enclosed air, and the valve assembly is zero point calibrated.

Figure 4:
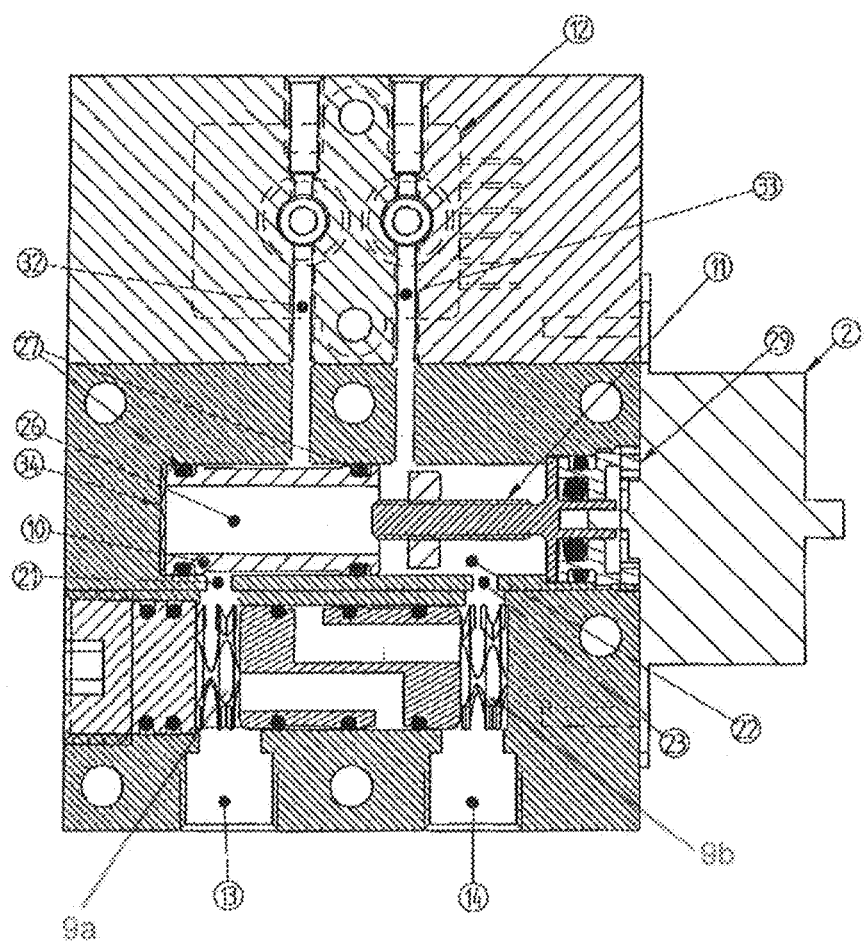
FIG. 4 shows the complete valve assembly in the measuring position.

FIG. 4 shows the complete valve assembly in measuring position.

After performing flushing and zero point calibration, the actuator 2 moves, via the axis 11, the calibration cone 10 in an axial direction towards the bottom 34 of the cavity 22. The calibration cone 10 is thereby brought to a position for measuring. Because of the movement of the calibration cone 10, in this measuring position, the sealing elements 27 are located on both sides of the duct 21. Further, the sealing elements 27 seal the connection between the cavity 22 and the calibration cone 10 and close the flushing passage, via the cavity 26. Moreover, in this position, one of the sealing elements 27 constitutes a barrier between the ducts 32 and 33. Consequently, the higher fluid pressure will be in contact with the differential pressure sensor 12 since the passage from the inlet 13, via the duct 21 to the peripheral surface of the cavity 22 and further via the duct 32 up to the differential pressure sensor 12, is open. At the same time, the passage at the low pressure side is open to the differential pressure sensor 12, from the outlet 14, via the duct 23 and the cavity 22 and further to the duct 33 and also to the differential pressure sensor 12. Accordingly, the differential pressure is measured. To minimize the power that is consumed to move the calibration cone 10 between the calibration/flushing position and the measuring position, and vice versa, the calibration cone 10 is balanced in the cavity 26 in a manner that the calibration cone 10 always has fluid of the same pressure level on both sides of its top and bottom. That is, between the bottom 34 of the cavity 22 and the calibration cone and also between the stop lug 29 and the calibration cone. Accordingly, only the frictional force between the sealing elements 27 and the wall of the cavity 22 must be overcome.

COMPONENT LIST 1 valve assembly
2 actuator
3 valve
4 measuring hose
5 measuring nipple
6 manual unit
7 valve body
8 safety valve cone
9 return spring
10 calibration cone
11 axis
12 differential pressure sensor
13 inlet
14 outlet
15 cavity
16 outer end
17 safety valve stop
18 sealing element
19 bottom
20 sealing element
21 duct
22 cavity
23 duct
24 cavity
25 recess
26 cavity
27 sealing element
28 outer end
29 stop lug
30 sealing element
31 sensor carrier
32 duct
33 duct
34 bottom
35 return spring

The invention claimed is:

1. A device comprising part of a system for measuring differential pressures in a fluid system, the device comprising:
   a valve assembly (1) including a valve body (7) with an inlet (13) and an outlet (14) for connection to the fluid system,
   ducts (32, 33) for facilitating communication with a differential pressure sensor (12) for measurement of the differential pressure,
   a cavity (22) communicating with the ducts (32, 33) and the cavity (22) including a calibration spool (10) which is axially moveable, along the cavity (22), between a measure position and an axially spaced initial position for zero point calibration and flushing the valve assembly (1), and the calibration spool (10) separating the differential pressure sensor (12) from the fluid system when the calibration spool (10) is in the initial position, and the calibration spool (10) including sealing elements (27), which prevent fluid communication between the ducts (32, 33) and the first cavity (22) when the calibration spool (10) is in the initial position,
   wherein a flushing function is obtained when the calibration spool (10) is spaced from the measuring position, the calibration spool (10) has a design that permits an open passage of flow between a high pressure side and a low pressure side, from the inlet (13), via a duct (21) between the inlet (13) and the cavity (22) in the valve body (7), to the cavity (22) in the valve body (7), through a cavity (26) in the calibration spool (10) and further to the cavity (22) in the valve body (7), thereafter to a duct (23) between the cavity (22) in the valve body (7) and the outlet (14) and thereafter to the outlet (14).

2. The device according to claim 1, wherein the calibration spool (10), in its measuring position, provides communication between the fluid system and the differential pressure sensor (12), and, when the calibration spool (10) is in the measuring position, the sealing element (27) of the calibration spool (10) avoids blocking the ducts (32, 33) to the differential pressure sensors (12) from the cavity (22) so as to facilitate communication with the differential pressure sensor (12).

3. The device according to claim 1, wherein a return spring (35) is arranged to always return the calibration spool (10) to its initial position, in positions other than the measuring position.

4. The device according to claim 1, wherein the valve assembly (1) includes an actuator (2) which is arranged to change the position of the calibration spool (10) in the cavity (22).

5. The device according to claim 4, wherein the actuator (2) is remote controlled.

6. The device according to claim 2, wherein a return spring (35) is arranged to always return the calibration spool (10) to its initial position, in positions other than the measuring position.

7. The device according to claim 2, wherein the valve assembly (1) includes an actuator (2) which is arranged to change the position of the calibration spool (10) in the cavity (22).

8. The device according to claim 3, wherein the valve assembly (1) includes an actuator (2) which is arranged to change the position of the calibration spool (10) in the cavity (22).

9. The device according to claim 6, wherein the valve assembly (1) includes an actuator (2) which is arranged to change the position of the calibration spool (10) in the cavity (22).

10. The device according to claim 7, wherein the actuator (2) is remote controlled.

11. The device according to claim 8, wherein the actuator (2) is remote controlled.

12. The device according to claim 9, wherein the actuator (2) is remote controlled.

* * * * *

UNITED STATES PATENT AND TRADEMARK OFFICE
CERTIFICATE OF CORRECTION

PATENT NO.        : 8,602,053 B2
APPLICATION NO.   : 13/805701
DATED             : December 10, 2013
INVENTOR(S)       : Daniel Jjilderos Page 1 of 1

It is certified that error appears in the above-identified patent and that said Letters Patent is hereby corrected as shown below:

Title Page, Item (73), the Assignee's Name should be "TA Hydronics AB" instead of "TA Hydronics AG".

Signed and Sealed this
Twenty-ninth Day of April, 2014

Michelle K. Lee
*Deputy Director of the United States Patent and Trademark Office*